(12) United States Patent
Chikaoka et al.

(10) Patent No.: US 7,978,387 B2
(45) Date of Patent: Jul. 12, 2011

(54) LASER PROJECTOR

(75) Inventors: Atsuhiko Chikaoka, Daito (JP); Atsuya Hirano, Daito (JP); Ken Nishioka, Daito (JP); Hiroshi Nishigaki, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 0 days.

(21) Appl. No.: 12/770,005

(22) Filed: Apr. 29, 2010

(65) Prior Publication Data

US 2011/0051210 A1 Mar. 3, 2011

(30) Foreign Application Priority Data

Apr. 30, 2009 (JP) ................. 2009-110250

(51) Int. Cl.
*G02B 26/08* (2006.01)
(52) U.S. Cl. ............... 359/199.1; 359/198.1; 359/199.3; 359/213.1
(58) Field of Classification Search .... 359/198.1–203.1, 359/213.1–215.1; 353/34, 37, 50–51; 345/30, 345/32; 348/98–101, 103, 108, 205, 744, 348/750, 755–756, 759, 769–770
See application file for complete search history.

(56) References Cited

U.S. PATENT DOCUMENTS

| 6,064,471 | A | * | 5/2000 | Nakagawa | ................... 356/4.01 |
| 7,130,095 | B1 | | 10/2006 | Wood | |
| 2004/0263937 | A1 | | 12/2004 | Fujii et al. | |
| 2005/0279922 | A1 | | 12/2005 | Wittenberg et al. | |

FOREIGN PATENT DOCUMENTS

JP 2008-268645 A 11/2008
* cited by examiner

*Primary Examiner* — James Phan
(74) *Attorney, Agent, or Firm* — Crowell & Moring LLP (57) ABSTRACT

A laser projector including a laser light source, a scan unit to scan the laser beam, a scan signal generation unit to generate a pulse signal, a drive unit to drive the scan unit and a pulse pattern adjustment unit to adjust a pulse pattern, wherein the pulse pattern adjustment unit adjusts the pulse pattern to a first pulse pattern for adjusting the swing amount from a first swing amount to a second swing amount in a projection interval, adjusts the pulse pattern to a second pulse pattern for adjusting the swing amount from the second swing amount back to the first swing amount in a first-stage interval in a non-projection interval, and adjusts the pulse pattern to a third pulse pattern for keeping the swing amount at the first swing amount in a second-stage interval in the non-projection interval until a scan position returns to the projection interval.

8 Claims, 8 Drawing Sheets

LASER PROJECTOR

BACKGROUND OF THE INVENTION

1. Field of the Invention

The present invention relates to a laser projector to display an image by scanning light projected from a laser light source on a projection surface.

2. Description of Related Art

As a laser projector using laser as a light source, there is known an art for displaying an image by projecting a laser beam to a screen from a laser light source and scanning the laser beam in two-axis directions by a reflection using a resonance mirror, for example.

The laser beam projected to the screen from the laser projector is scanned with an irradiation angle being changed by the mirror. Accordingly, a trapezoidal distortion, i.e., a phenomenon where an image projected on the screen becomes larger as a distance from the projector to the screen becomes longer, may arise.

As an art for correcting the trapezoidal distortion, there is generally known an art for correcting an image so that the image becomes a rectangle by performing image processing in a projector.

Further, there is known a laser projector wherein an image to be projected on a screen is corrected and displayed by measuring a distance from the projector to the screen and adjusting the angle at which a mirror scans a laser beam according to the measured distance. (For example, refer to JP-A-2008-268645.)

However, in the conventional art mentioned above, there has been a problem that information can be partly missing by optical image processing and that an image quality of the displayed image can be degraded.

Moreover, in the case of JP-A-2008-268645 mentioned above, the laser beam reflected on the screen may not return toward the projector because the irradiation angle of the laser beam to the screen is shallow etc., for example. In that case, the processing for correcting the image can not be performed when the reflected light can not be detected at a light receiving section and the distance from the projector to the screen can not be measured.

Furthermore, when the mirror increases or decreases a scan width by adjusting the angle at which the mirror scans the laser beam in order to correct the trapezoidal distortion, there has been a need for adjusting the angle properly so as not to increase the scan width too much or decrease it too much.

SUMMARY OF THE INVENTION

It is, therefore, a main object of the present invention to provide a laser projector capable of correcting a projected image more reliably.

According to a first aspect of the present invention, there is provided a laser projector, including, a laser light source to project a laser beam, a scan unit to scan the laser beam in a horizontal direction and a vertical direction to form an image on a projection surface with a trajectory of the laser beam scanned in the horizontal direction being lined up in the vertical direction, a scan signal generation unit to generate a pulse signal causing the scan unit to scan the laser beam in the horizontal direction, a drive unit to drive the scan unit back and forth so that the laser beam is scanned in the horizontal direction in response to the pulse signal and a pulse pattern adjustment unit to adjust a pulse pattern of the pulse signal in order to change a swing amount of the scan unit to scan the laser beam in the horizontal direction, wherein the pulse pattern adjustment unit adjusts the pulse pattern to a first pulse pattern for projection for adjusting the swing amount from a first swing amount to a second swing amount in a projection interval where a scan position in the vertical direction is shifted from a starting position to an ending position with the scan unit scanning the laser beam in the horizontal direction to form the image on the projection surface, adjusts the pulse pattern to a second pulse pattern for adjusting the swing amount from the second swing amount back to the first swing amount in a first-stage interval in a non-projection interval where the scan position in the vertical direction is shifted from the ending position back to the starting position, and adjusts the pulse pattern to a third pulse pattern for keeping the swing amount at the first swing amount in a second-stage interval in the non-projection interval until the scan position returns to the starting position in the projection interval.

According to a second aspect of the present invention, there is provided a laser projector, including, a laser light source to project a laser beam, a scan unit to scan the laser beam in a horizontal direction and a vertical direction to form an image on a projection surface with a trajectory of the laser beam scanned in the horizontal direction being lined up in the vertical direction, a scan signal generation unit to generate a pulse signal causing the scan unit to scan the laser beam in the horizontal direction, a drive unit to drive the scan unit back and forth so that the laser beam is scanned in the horizontal direction in response to the pulse signal, an angle detection unit to detect one of an elevation angle and a depression angle at which the laser projector is set to the projection surface and a pulse pattern adjustment unit to adjust a pulse pattern of the pulse signal in order to change a swing amount of the scan unit to scan the laser beam in the horizontal direction according to the angle detected by the angle detection unit, wherein the pulse pattern adjustment unit adjusts the swing amount of the scan unit by performing control to adjust the pulse pattern of the pulse signal according to the angle detected by the angle detection unit by, at least one of, increasing or decreasing the number of the pulse signal, increasing or decreasing the width of the pulse signal and increasing or decreasing the vibration amplitude of the pulse signal, so that the pulse pattern adjustment unit adjusts the pulse pattern to a first pulse pattern for projection for adjusting the swing amount from a first swing amount to a second swing amount in a projection interval where a scan position in the vertical direction is shifted from a starting position to an ending position with the scan unit scanning the laser beam in the horizontal direction to form the image on the projection surface, adjusts the pulse pattern to a second pulse pattern for adjusting the swing amount from the second swing amount back to the first swing amount in a first-stage interval in a non-projection interval where the scan position in the vertical direction is shifted from the ending position back to the starting position, and adjusts the pulse pattern to a third pulse pattern for keeping the swing amount at the first swing amount in a second-stage interval in the non-projection interval until the scan position returns to the starting position in the projection interval, and the pulse pattern adjustment unit makes the swing amount of the scan unit smaller as the angle at which the laser beam is projected on the projection surface becomes shallower.

BRIEF DESCRIPTION OF THE DRAWINGS

The above and other objects, advantages and features of the present invention will become more fully understood from the detail description given hereinbelow and the appended drawings which are given by way of illustration only, and thus are not intended as a definition of the limits of the present invention, and wherein.

DESCRIPTION OF THE PREFERRED EMBODIMENT

Hereinafter, an embodiment of the present invention will be described with reference to the drawings. In addition, the scope of the invention is not limited to the examples as shown in the drawings.

Figure 1:
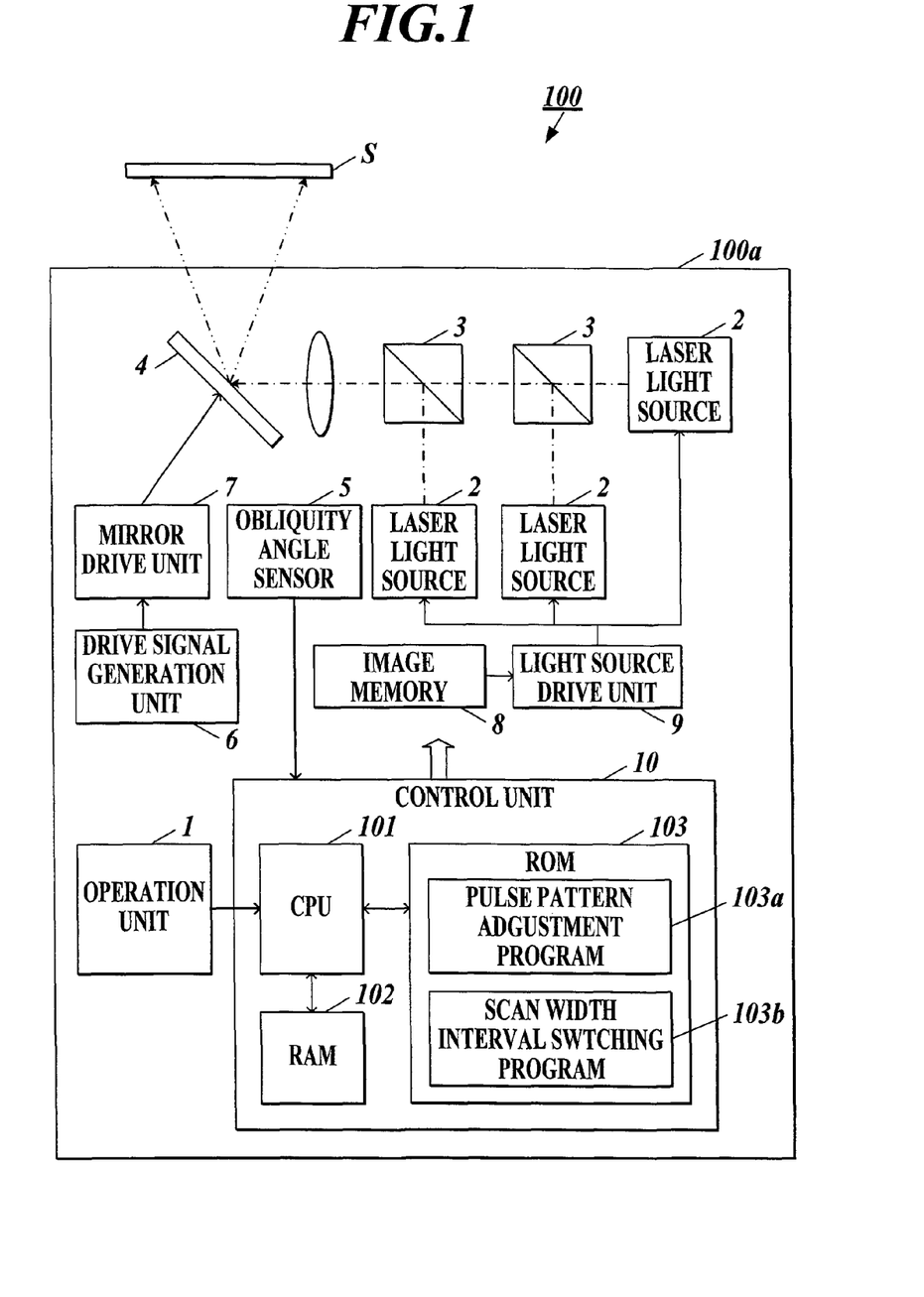
FIG. 1 is a block diagram showing a main structure of a laser projector in the present invention.

As shown in FIG. 1, the laser projector 100 includes an operation unit 1, laser light sources 2 to project laser beams, mirror units 3 to multiplex the laser beams projected from the laser light sources 2, an electromagnetic driven scan mirror 4 to scan the laser beam projected from the laser light sources 2 on a screen S as a projection surface, an obliquity angle sensor 5 to detect an obliquity angle of the laser projector 100 to the screen S, a drive signal generation unit 6 to generate a drive signal at a predetermined frequency, a mirror drive unit 7 to drive the electromagnetic driven scan mirror 4 based on the drive signal generated by the drive signal generation unit 6, an image memory 8 to store image data of an image to be scanned on the screen S, a light source drive unit 9 to drive the laser light sources 2 based on the image data, a control unit 10 and the like in a case 100a.

The laser light sources 2 are, for example, semiconductor lasers (LD: Laser Diode), and emit laser beams of red (R), green (G) and blue (B), respectively, by being driven by the light source drive unit 9 based on the image data stored in the image memory 8.

The mirror units 3 are, for example, dichroic mirrors or the like which allow the light having a predetermined wavelength to transmit and which reflect the light having wavelength other than the predetermined wavelength, and the mirror units 3 multiplex the laser beams of each color projected from the plurality of laser light sources 2 to make a laser beam having a single light axis and output the laser beam to the electromagnetic driven scan mirror 4.

The electromagnetic driven scan mirror 4 functions as a scan unit which reflects the laser beam projected from the laser light sources 2 in two-dimensional direction to project the laser beam and scan the laser beam on the screen S by being driven electromagnetically. An electromagnetic driven MEMS mirror using a technique of MEMS (Micro Electro Mechanical Systems) is, for example, applied as the electromagnetic driven scan mirror 4. The MEMS mirror is a micro device which is manufactured by accumulating a mechanical structure and an electric circuit on a silicon wafer by using the micro machining technology. The entire apparatus can be made smaller by using the MEMS mirror.

Figure 2:
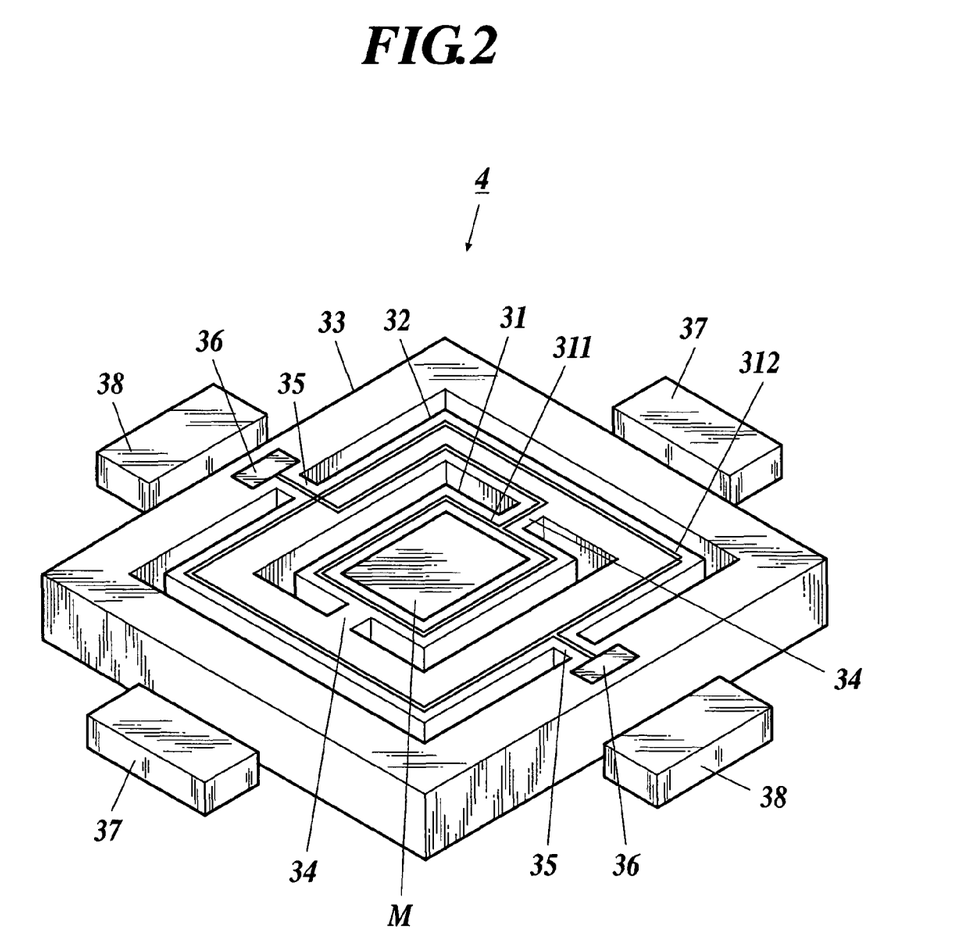
FIG. 2 is a perspective view showing a structure of an electromagnetic driven scan mirror.

As shown in FIG. 2, the MEMS mirror as the electromagnetic driven scan mirror 4 includes a mirror substrate 31 to reflect the laser beam, an inner frame 32 formed so as to enclose the mirror substrate 31, an outer frame 33 formed so as to enclose the inner frame 32. The mirror substrate 31 is supported at the inner side of the inner frame 32 by inner shafts 34 and can swing about the axis of the inner shafts 34. Further, the inner frame 32 is supported at the inner side of the outer frame 33 by outer shafts 35 in a direction orthogonal to the inner shafts 34 and can swing about the axis of the outer shafts 35.

A mirror M is provided at the approximately center of the surface of the mirror substrate 31, and a planar coil 311 is formed at the periphery of the mirror M so as to enclose the mirror M. Further, a planar coil 312 is formed at the periphery of the surface of the inner frame 32, and both ends of each of the coils 311, 312 are electrically connected to the electrodes 36.

Moreover, a pair of permanent magnets 37 and a pair of permanent magnets 38 are disposed at the sides of the outer frame 33 so that the north pole of the magnet and the south pole of the magnet face each other in each pair. In addition, the paired permanent magnets 37 face each other in the direction of the inner shafts 34, and the paired permanent magnets 38 face each other in the direction of the outer shafts 35.

The drive signal generation unit 6 generates the drive signal which has the resonance frequency innate to the electromagnetic driven scan mirror 4 according to the control by the control unit 10.

Particularly, the drive signal generation unit 6 functions as a scan signal generation unit. That is, the drive signal generation unit 6 generates the drive signal causing the electromagnetic driven scan mirror 4 to perform a main scan of the laser beam in a horizontal direction and generates the drive signal causing the electromagnetic driven scan mirror 4 to perform a sub scan of the laser beam in a vertical direction.

Besides, the main scan in the horizontal direction performed by the electromagnetic driven scan mirror 4 is quick, and the sub scan in the vertical direction performed by the electromagnetic driven scan mirror 4 is slow. Each time a single back-and-forth movement of the main scan in the horizontal direction is performed, the sub scan in the vertical direction follows in which the scan position is shifted to the lower position of the screen S by one row. However, after the main scan on the undermost row is performed, the sub scan in the upper direction back to the upmost row is performed relatively quickly in order that the main scan on the upmost row will be performed.

The mirror drive unit 7 functions as a drive unit to drive the electromagnetic driven scan mirror 4 based on the drive signal generated by the drive signal generation unit 6 by being connected to the electrodes 36 of the electromagnetic driven scan mirror 4.

When an electric current is applied by applying drive voltage to the electrodes 36 at both ends of the coils 311, 312 in the electromagnetic driven scan mirror 4, a Lorentz force is generated by the interaction with the magnetic field which is generated by the permanent magnets 37, 38 and the mirror substrate 31 and the inner frame 32 incline respectively, the inner shafts 34 and the outer shafts 35 acting as an axis.

Therefore, by controlling the electric current signal to be applied to the electromagnetic driven scan mirror 4, the electromagnetic driven scan mirror 4 can swing freely in two directions orthogonal to each other (the horizontal direction and the vertical direction), the inner shafts 34 and the outer shafts 35 acting as the axis.

When a pulse signal as the drive signal fluctuating in a predetermined cycle is applied to the electromagnetic driven scan mirror 4, the electromagnetic driven scan mirror 4 vibrates in the predetermined cycle according to the cycle (frequency) of the pulse signal. Particularly, when driven at a resonance frequency of $f_0$, the electromagnetic driven scan mirror 4 swings at the maximum deflection angle of the current value. Therefore, a large image can be displayed most efficiently at low power.

The obliquity angle sensor 5 functions as an angle detection unit to detect one of an elevation angle and a depression angle of the case 100a to the screen S, i.e., an angle at which the laser projector 100 is set to the screen S, and outputs the detected angle data to the control unit 10.

The operation unit 1 is provided on the surface of the case 100a and receives an input of data etc. concerning one of the elevation angle and the depression angle of the case 100a to the screen S, i.e., the angle at which the laser projector 100 is set to the screen S. And then, the operation unit 1 outputs the data and the operation signal to the control unit 10.

The image memory 8 stores image data of an image to be displayed on the screen S. Further, the supply source of the image data is not limited to the image memory 8 and image data stored in various types of storage devices such as a PC (Personal Computer), a video camera or the like connected to the case 100a may be used.

The light source drive unit 9 drives the laser light sources 2 to adjust the laser beam for each pixel and to change a color of the laser beam multiplexed at the mirror units 3 based on the image data read from the image memory 8.

The control unit 10 includes, for example, a CPU (Central Processing Unit) 101, a RAM (Random Access Memory) 102 used as a work area of the CPU 101, and a ROM (Read Only Memory) 103 which stores various types of data, programs etc. and the like.

The CPU 101 integrally controls the overall operation of the laser projector 100 by executing various types of programs stored in the ROM 103 in response to the input signal inputted from each unit of the laser projector 100 and outputting the output signal to each unit based on the programs according to the execution.

The ROM 103 stores a pulse pattern adjustment program 103a, a scan width interval switching program 103b and the like in a program storage area.

Further, in the ROM 103, the data is stored concerning a pulse signal for adjusting a swing amount of the electromagnetic driven scan mirror 4 to scan the laser beam in the horizontal direction corresponding to the angle at which the laser beam is projected on the screen S so that the image projected on the screen S becomes a rectangle.

The pulse pattern adjustment program 103a is a program to allow the CPU 101 to function so as to adjust a pulse pattern of the pulse signal generated by the drive signal generation unit 6 according to the angle detected by the obliquity angle sensor 5 or the data inputted via the operation unit 1, for example.

In executing the pulse pattern adjustment program 103a, the CPU 101 adjusts the pulse pattern of the pulse signal by, for example, modulating the pulse signal generated by the drive signal generation unit 6 so as to make the swing amount of the electromagnetic driven scan mirror 4 driven by the mirror drive unit 7 smaller as the angle at which the laser beam is projected on the screen S becomes shallower, based on the angle (one of the elevation angle and the depression angle) of the laser projector 100 (the case 100a) detected by the obliquity angle sensor 5, or based on the data inputted via the operation unit 1.

The CPU 101 functions as a pulse pattern adjustment unit by executing the above pulse pattern adjustment program 103a.

Specifically, the CPU 101 as the pulse pattern adjustment unit executes control so as to adjust the swing amount of the electromagnetic driven scan mirror 4 driven by the mirror drive unit 7 by increasing or decreasing the number of the pulse signal, including thinning out the pulse number, for example, generated by the drive signal generation unit 6 as the scan signal generation unit.

Besides, the CPU 101 as the pulse pattern adjustment unit executes the control so as to adjust the swing amount of the electromagnetic driven scan mirror 4 driven by the mirror drive unit 7 by increasing or decreasing the width of the pulse signal generated by the drive signal generation unit 6 as the scan signal generation unit.

Furthermore, the CPU 101 as the pulse pattern adjustment unit executes the control so as to adjust the swing amount of the electromagnetic driven scan mirror 4 driven by the mirror drive unit 7 by increasing or decreasing the vibration amplitude of the pulse signal generated by the drive signal generation unit 6 as the scan signal generation unit.

The scan width interval switching program 103b is a program to allow the CPU 101 as the pulse pattern adjustment unit to adjust the pulse pattern to the pulse pattern for projection for adjusting the swing amount of the electromagnetic driven scan mirror 4 from a first swing amount to a second swing amount in a projection interval where a scan position in the vertical direction is shifted from a starting position to an ending position of a frame with the electromagnetic driven scan mirror 4 scanning the laser beam in the horizontal direction to form an image on the screen S, for example.

Besides, the scan width interval switching program 103b is a program to allow the CPU 101 as the pulse pattern adjustment unit to adjust the pulse pattern to the pulse pattern for adjusting the swing amount of the electromagnetic driven scan mirror 4 from the second swing amount back to the first swing amount in a first-stage interval in a non-projection interval, i.e., a swing amount adjustment interval, where the scan position in the vertical direction is shifted from the ending position back to the starting position of the frame by the electromagnetic driven scan mirror 4, for example. Furthermore, the scan width interval switching program 103b is a program to allow the CPU 101 as the pulse pattern adjustment unit to adjust the pulse pattern to the pulse pattern for keeping the swing amount of the electromagnetic driven scan mirror 4 at the first swing amount in a second-stage interval in the non-projection interval, i.e., a swing amount keeping interval, until the scan position returns to the starting position in the projection interval, for example.

In executing the scan width interval switching program 103b, the CPU 101 makes the pulse signal modulated so as to adjust the pulse pattern to the pulse pattern corresponding to each of the projection interval, the swing amount adjustment interval in the non-projection interval, or the swing amount keeping interval in the non-projection interval respectively.

By executing the above scan width interval switching program 103b, the CPU 101 functions as an interval switching control unit to switch the pulse pattern so as to allow a proper scan for each of the projection interval, the swing amount adjustment interval (the first-stage interval in the non-projection interval), or the swing amount keeping interval (the second-stage interval in the non-projection interval) respectively.

In addition, the CPU 101 as the interval switching control unit functions as a part of the pulse pattern adjustment unit employing the pulse pattern where the length of the first-stage interval in the non-projection interval is shortened in order to assure a predetermined length of the second-stage interval.

Next, the processing to be performed when the laser projector 100 in the present invention projects an image on the screen S will be described.

Here, the angle of the mirror is indicated by "+θ" when the electromagnetic driven scan mirror 4 of the laser projector 100 performs a scan on the upmost row, and the angle of the mirror is indicated by "−θ" when the electromagnetic driven scan mirror 4 of the laser projector 100 performs a scan on the undermost row.

Figure 3A:
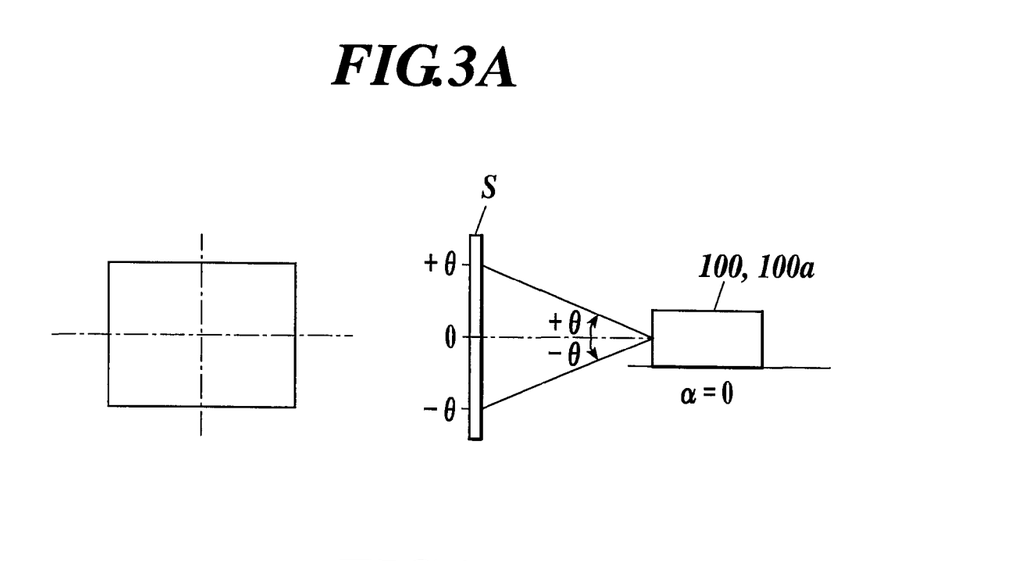
FIG. 3A is an explanatory diagram showing an angle at which the laser projector projects an image on the screen, the angle α of a case being 0°.

As shown in FIG. 3A, when the angle α (one of the elevation angle and the depression angle) of the laser projector 100 (the case 100a) to the screen S meets α=0°, the angle at which the laser beam is projected on the screen S is shallower when the laser beam is scanned on the upper part or the lower part of the screen S than when the laser beam is projected vertically to the screen S and is scanned in front of the laser projector 100.

When the obliquity angle sensor 5 detects the angle α (one of the elevation angle and the depression angle) at which the laser projector 100 (the case 100a) is set to the screen S as α=0°, the CPU 101 as the pulse pattern adjustment unit makes the drive signal generation unit 6 generate the pulse signal which makes the swing amount of the electromagnetic driven scan mirror 4 the maximum at the time when the laser projector 100 faces the center in the vertical direction of the screen S (the position of "0" in FIG. 3A) scanning the laser beam in the horizontal direction. Also, the CPU 101 makes the drive signal generation unit 6 generate the pulse signal which makes the swing amount of the electromagnetic driven scan mirror 4 gradually smaller as the scan position of the laser beam gets closer to the upmost row (the position of "+θ" in FIG. 3A) or the undermost row (the position of "−θ" in FIG. 3A).

Figure 3B:
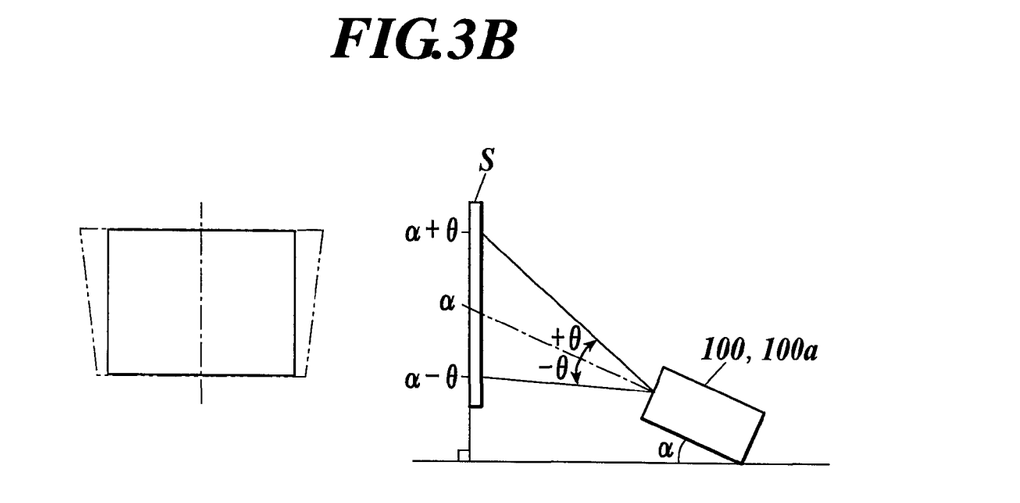
FIG. 3B is an explanatory diagram showing the angle at which the laser projector projects the image on the screen, the angle α of the case being α°.

Further, as shown in FIG. 3B, when the angle α (one of the elevation angle and the depression angle) of the laser projector 100 (the case 100a) to the screen S meets α=α°, according to the angle of the electromagnetic driven scan mirror 4 in the vertical direction, the scan position of the laser beam gets closer to the upmost row, in which case the angle at which the laser beam is projected on the screen S gets closer to "α+θ," or the scan position of the laser beam gets closer to the undermost row, in which case the angle at which the laser beam is projected on the screen S gets closer to "α−θ."

Further, when the obliquity angle sensor 5 detects the angle α (one of the elevation angle and the depression angle) at which the laser projector 100 (the case 100a) is set to the screen S as α=α°, the CPU 101 as the pulse pattern adjustment unit makes the drive signal generation unit 6 generate the pulse signal which makes the swing amount of the electromagnetic driven scan mirror 4 smaller as the angle at which the laser beam is projected on the screen S becomes shallower, while the scan position of the laser beam is shifted from the upmost row (the position of "α+θ" in FIG. 3B) to the undermost row (the position of "α−θ" in FIG. 3B).

Figure 4A:
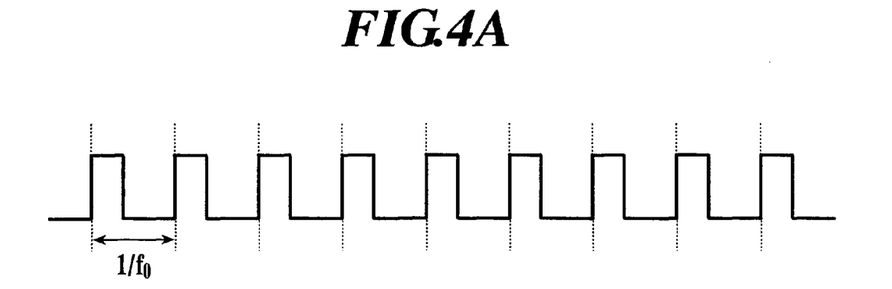
FIG. 4A is an explanatory diagram showing a pulse signal having a resonance frequency of $f_0$, the pulse signal being standard.

Specifically, the CPU 101 as the pulse pattern adjustment unit performs control so as to make the drive signal generation unit 6 generate an intermittent pulse signal, which has a decreased pulse number (Refer to FIG. 4B and FIG. 4C.) with the pulse thinned out based on the pulse signal shown in FIG. 4A having a resonance frequency of $f_0$, which makes the swing amount of the electromagnetic driven scan mirror 4 the maximum. In this way, the CPU 101 performs control so as to make the swing amount of the electromagnetic driven scan mirror 4 smaller by driving the electromagnetic driven scan mirror 4 with the intermittent pulse signal with the pulse thinned out more and more, as the scan position of the laser beam gets closer to the upmost row or the undermost row and the angle at which the laser beam is projected on the screen S becomes shallower, according to the angle of the electromagnetic driven scan mirror 4 in the vertical direction.

Figure 5A:
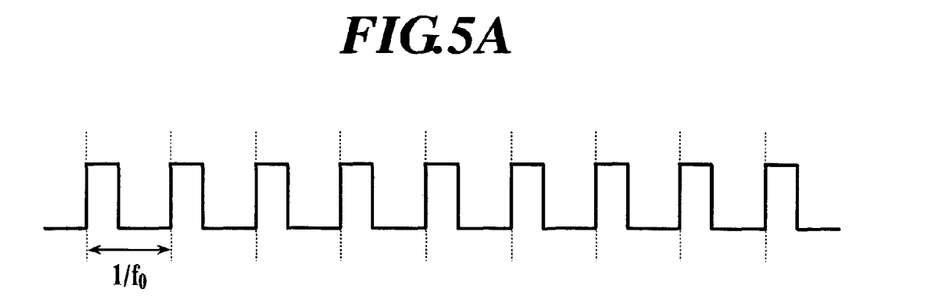
FIG. 5A is an explanatory diagram showing a pulse signal having the resonance frequency of $f_0$, the pulse signal being standard.
Figure 5B:
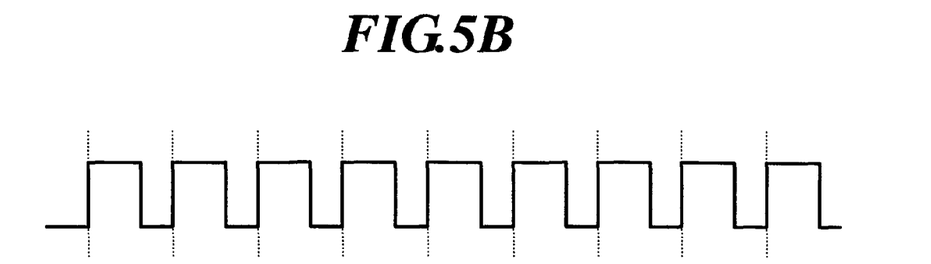
FIG. 5B is an explanatory diagram showing a pulse signal having the resonance frequency of $f_0$, the width of the pulse being increased.
Figure 5C:
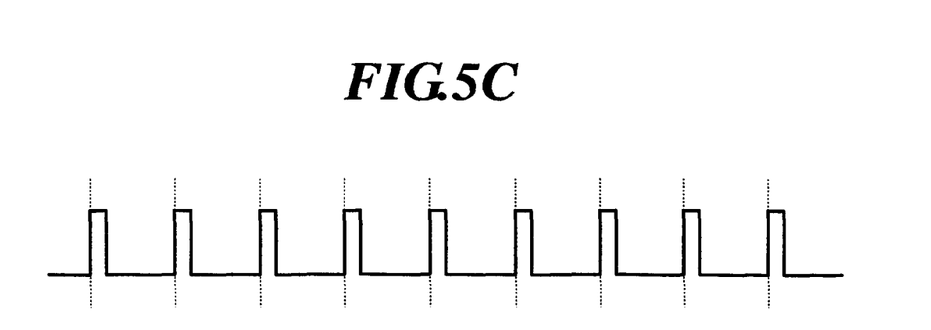
FIG. 5C is an explanatory diagram showing a pulse signal having the resonance frequency of $f_0$, the width of the pulse being decreased.

Besides, the CPU 101 as the pulse pattern adjustment unit performs control so as to make the drive signal generation unit 6 generate the pulse signal with an increased pulse width (Refer to FIG. 5B.) or the pulse signal with a decreased pulse width (Refer to FIG. 5C.) based on the pulse signal shown in FIG. 5A having a resonance frequency of $f_0$. In this way, the CPU 101 performs control so as to make the swing amount of the electromagnetic driven scan mirror 4 smaller by driving the electromagnetic driven scan mirror 4 with the pulse signal with the decreased pulse width, as the scan position of the laser beam gets closer to the upmost row or the undermost row and the angle at which the laser beam is projected on the screen S becomes shallower, according to the angle of the electromagnetic driven scan mirror 4 in the vertical direction.

Figure 6A:
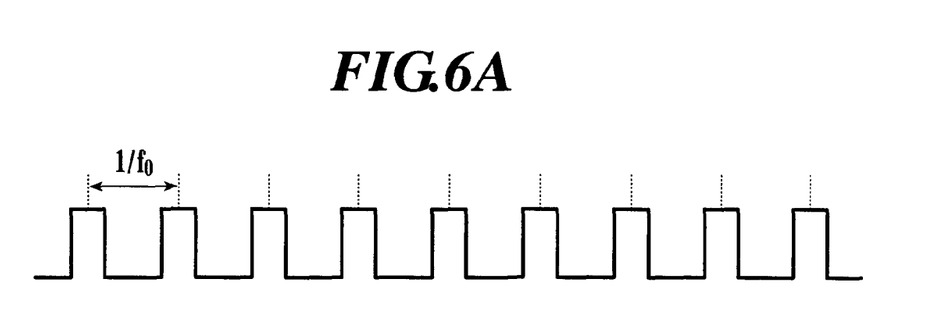
FIG. 6A is an explanatory diagram showing a pulse signal having the resonance frequency of $f_0$, the pulse signal being standard.
Figure 6B:
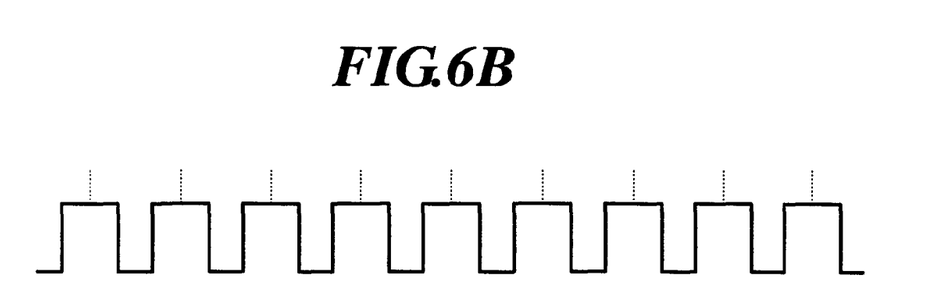
FIG. 6B is an explanatory diagram showing a pulse signal having the resonance frequency of $f_0$, the width of the pulse being increased with the pulse center fixed.
Figure 6C:
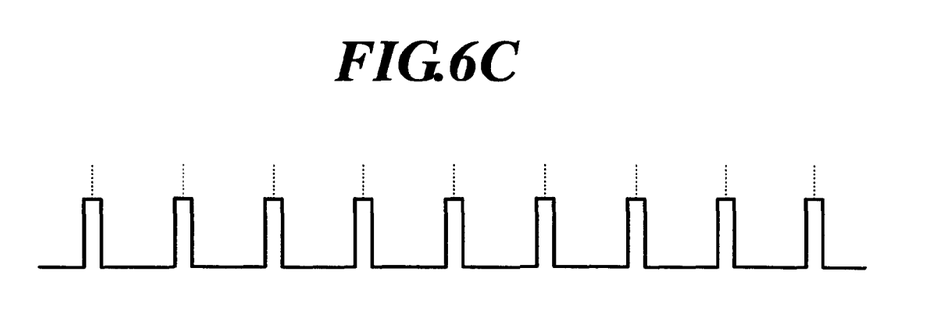
FIG. 6C is an explanatory diagram showing a pulse signal having the resonance frequency of $f_0$, the width of the pulse being decreased with the pulse center fixed.

In addition, it is preferable that, as shown in FIG. 6A, FIG. 6B and FIG. 6C, the CPU 101 as the pulse pattern adjustment unit increases or decreases the width of the pulse signal with the center of the pulse fixed at the pulse center of the pulse signal shown in FIG. 6A having a resonance frequency of $f_0$. By increasing or decreasing the pulse width in that way, the scan width of the laser beam can be increased or decreased in a shorter time and a larger distortion can be corrected properly.

Figure 7A:
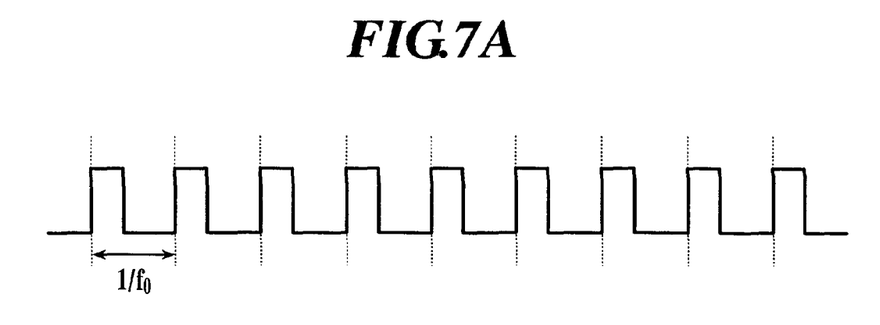
FIG. 7A is an explanatory diagram showing a pulse signal having the resonance frequency of $f_0$, the pulse signal being standard.
Figure 7B:
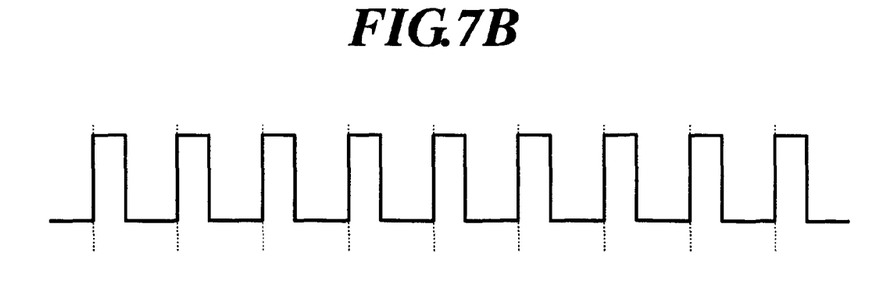
FIG. 7B is an explanatory diagram showing a pulse signal having the resonance frequency of $f_0$, the vibration amplitude of the pulse being increased.
Figure 7C:
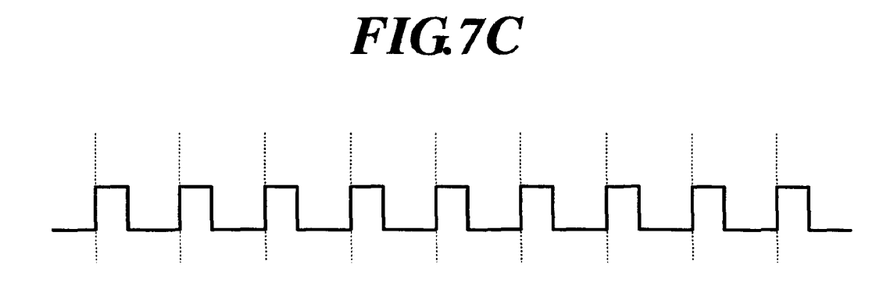
FIG. 7C is an explanatory diagram showing a pulse signal having the resonance frequency of $f_0$, the vibration amplitude of the pulse being decreased.

Furthermore, the CPU 101 as the pulse pattern adjustment unit performs control so as to make the drive signal generation unit 6 generate the pulse signal with an increased pulse vibration amplitude (Refer to FIG. 7B.) or the pulse signal with a decreased pulse vibration amplitude (Refer to FIG. 7C.) based on the pulse signal shown in FIG. 7A having a resonance frequency of $f_0$. In this way, the CPU 101 performs control so as to make the swing amount of the electromagnetic driven scan mirror 4 smaller by driving the electromagnetic driven scan mirror 4 with the pulse signal with the decreased pulse vibration amplitude, as the scan position of the laser beam gets closer to the upmost row or the undermost row and the angle at which the laser beam is projected on the screen S becomes shallower, according to the angle of the electromagnetic driven scan mirror 4 in the vertical direction.

Next, a timing at which the laser projector 100, in projecting an image on the screen S, changes the pulse pattern and switches the pulse signal in 1 frame of the image, and an interval where the electromagnetic driven scan mirror 4 scans the laser beam with the switched pulse signal will be described with reference to FIG. 8.

Here, the laser projector 100 which is set to the screen S at the projection angle shown in FIG. 3B ($\alpha$; $\alpha_1 21\ \alpha_2 < \alpha_3$) is described as an example.

Figure 8:
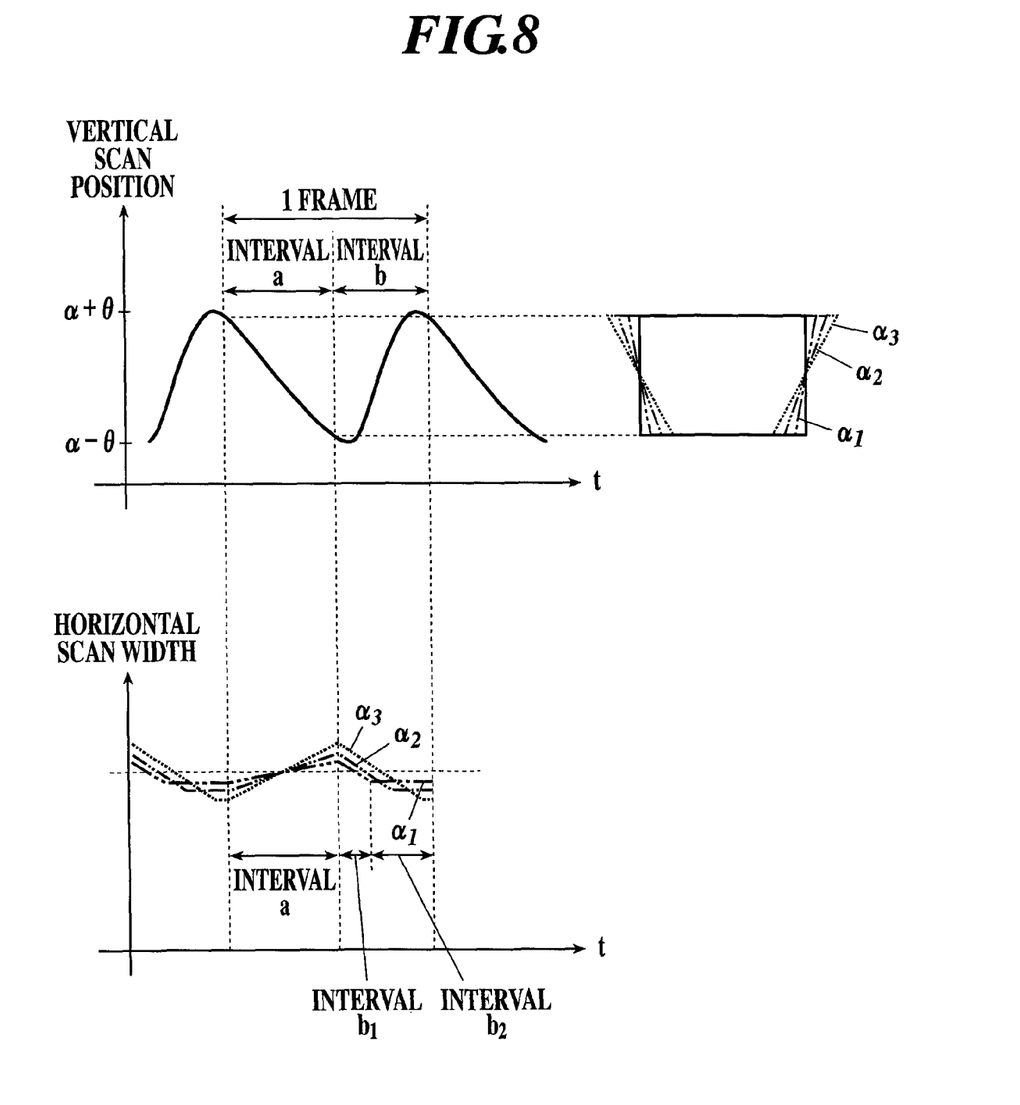
FIG. 8 is an explanatory diagram regarding a projection interval where projection is performed by the laser projector, and a first-stage interval and a second-stage interval in a non-projection interval.

As shown in FIG. 8, an interval where the electromagnetic driven scan mirror 4 scans the laser beam in the laser projector 100 includes a projection interval (an interval a) and a non-projection interval (an interval b). The projection interval is the interval where a vertical scan position is shifted in the vertical direction from the upmost row, a starting position of the frame, to the undermost row, an ending position of the frame, with the electromagnetic driven scan mirror 4 scanning the laser beam in the horizontal direction to form an image on the screen S. On the other hand, the non-projection interval is the interval where the vertical scan position is shifted in the vertical direction from the undermost row, the ending position, back to the upmost row, the starting position. In addition, the projection interval (the interval a) where the laser beam is actually scanned to form an image is the interval between a row slightly under the upmost row and a row slightly above the undermost row, in the interval where the scan position is shifted from the upmost row (the position of "$\alpha+\theta$") to the undermost row (the position of "$\alpha-\theta$").

Furthermore, the non-projection interval (the interval b) includes a first-stage interval (a swing amount adjustment interval) $b_1$ just after the prior projection interval (the interval a), and a second-stage interval (a swing amount keeping interval) $b_2$ just before the next projection interval (the interval a). In addition, the first-stage interval $b_1$ and the second-stage interval $b_2$ shown in FIG. 8 are the intervals corresponding to a case where the angle $\alpha$ (the elevation angle) at which the laser projector 100 (the case 100a) is set to the screen S meets $\alpha = \alpha_1$.

In the projection interval (the interval a), the pulse pattern is set to the pulse pattern with a relatively large pulse number (a pulse pattern for projection) as shown in FIG. 4A, for example, so that the swing amount of the electromagnetic driven scan mirror 4 is adjusted from the smallest swing amount (the first swing amount) at the position of "$\theta+\theta$," the starting position, to the largest swing amount (the second swing amount) at the position of "$\alpha-\theta$," the ending position.

Figure 4B:
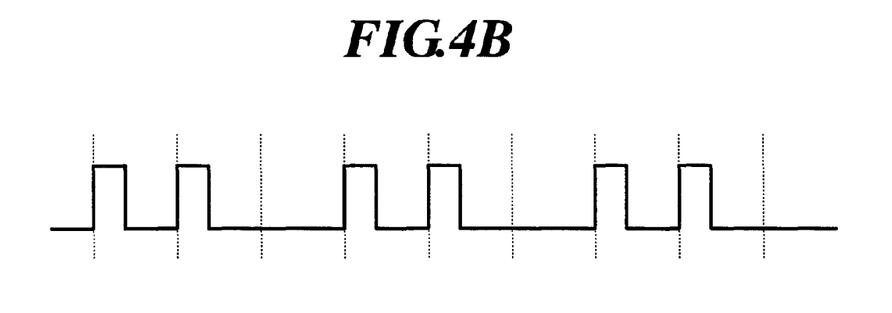
FIG. 4B is an explanatory diagram showing a pulse signal having the resonance frequency of $f_0$, the number of the pulse being decreased.
Figure 4C:
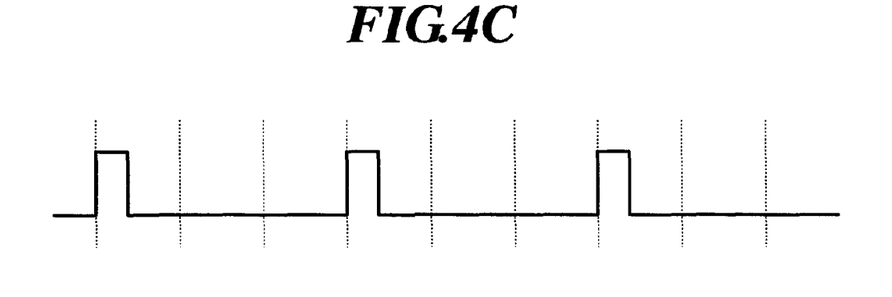
FIG. 4C is an explanatory diagram showing a pulse signal having the resonance frequency of $f_0$, the number of the pulse being further decreased.

Next, in the first-stage interval $b_1$ in the non-projection interval (the interval b), the pulse pattern is set to the pulse pattern with a relatively small pulse number (a pulse pattern for adjusting the swing amount) as shown in FIG. 4C, for example, so that the swing amount of the electromagnetic driven scan mirror 4 is adjusted from the largest swing amount (the second swing amount) at the position of "$\alpha-\theta$," the ending position, back to the smallest swing amount (the first swing amount) by the time the second-stage interval $b_2$ starts.

Next, in the second-stage interval $b_2$ in the non-projection interval (the interval b), the pulse pattern is set to the pulse pattern with a moderate pulse number (a pulse pattern for keeping swing amount) as shown in FIG. 4B, for example, so that the swing amount of the electromagnetic driven scan mirror 4 is kept at the smallest swing amount (the first swing amount) until the scan position returns to the position of "$\alpha+\theta$," the starting position of the next projection interval (the interval a).

In the projection interval (the interval a), while the scan position in the vertical direction is shifted from the position of "$\alpha+\theta$," the starting position, to the position of "$\alpha-\theta$," the ending position, with the electromagnetic driven scan mirror 4 scanning the laser beam in the horizontal direction, the swing amount of the electromagnetic driven scan mirror 4 is gradually increased from the first swing amount to the second swing amount by setting the pulse pattern to the pulse pattern for projection shown in FIG. 4A. Therefore, the image projected on the screen S is displayed being corrected to become a rectangle.

Further, in the first-stage interval $b_1$ in the non-projection interval (the interval b), the swing amount of the electromagnetic driven scan mirror 4 is gradually decreased and returns to the first swing amount corresponding to the starting position in the projection interval (the interval a) by setting the pulse pattern to the pulse pattern for adjusting the swing amount shown in FIG. 4C.

Moreover, in the second-stage interval $b_2$ in the non-projection interval (the interval b), the swing amount of the electromagnetic driven scan mirror 4 is kept at the first swing amount by setting the pulse pattern to the pulse pattern for keeping the swing amount shown in FIG. 4B. Therefore, it is possible to move on to the scan in the next projection interval (the interval a) smoothly.

In addition, as the angle $\alpha$ (the elevation angle) at which the projector 100 (the case 100a) is set to the screen S becomes larger ($\alpha_1 < \alpha_2 < \alpha_3$), the trapezoidal distortion becomes larger and the difference between the smallest swing amount (the first swing amount) and the largest swing amount (the second swing amount) in the swing amount of the electromagnetic driven scan mirror 4 becomes larger. Accordingly, the need arises to adjust the swing amount from the first swing amount to the second swing amount in the projection interval (the interval a) more quickly. Responding to this need, the pulse pattern is set to the ideal pulse pattern for projection according to the angle $\alpha$ (the elevation angle) at which the laser projector 100 (the case 100a) is set to the screen S.

Also, in the non-projection interval (the interval b), the pulse pattern is set to the pulse pattern for adjusting the swing amount which makes it possible to shorten the length of the first-stage interval $b_1$ (the swing amount adjustment interval $b_1$) in order to assure a predetermined length of the second-stage interval $b_2$ (the swing amount keeping interval $b_2$).

By assuring the predetermined length of the second-stage interval $b_2$ in the non-projection interval b (the interval b), the swing amount of the electromagnetic driven scan mirror 4 can be assuredly adjusted to the first swing amount corresponding to the starting position in the projection interval (the interval a). Therefore, it is possible to move on to the scan in the next projection interval (the interval a) smoothly.

Without the second-stage interval $b_2$, for example, the interval is switched to the projection interval (the interval a) as soon as the first-stage interval $b_1$ finished. Accordingly, in that case, the swing amount of the electromagnetic driven scan mirror 4 may not be adjusted to the first swing amount when the interval is switched to the projection interval (the interval a). Concretely, when the interval is switched to the projection interval (the interval a), the swing amount of the electromagnetic driven scan mirror 4 may not return completely to the first swing amount, or may become a swing amount larger than the first swing amount. Particularly, as the electromagnetic driven scan mirror 4 is driven being vibrated at a predetermined cycle according to the frequency of the pulse pattern (the pulse signal), the aftereffect of the vibration may act on the swing amount and the swing amount may not be switched smoothly in accordance with the timing at which the interval is switched. Therefore, the second-stage interval $b_2$ is necessary in order to make the swing amount stable at the desired swing amount. Additionally, the pulse pattern for adjusting the swing amount is also set to the ideal pulse pattern according to the angle α (the elevation angle) at which the laser projector 100 (the case 100*a*) is set to the screen S.

Thus, the control is performed by the CPU 101 as the pulse pattern adjustment unit which repeatedly carries out the switching from the pulse pattern for projection (Refer to FIG. 4A.) to the pulse pattern for adjusting the swing amount (Refer to FIG. 4C.) at the timing when the interval is switched from the projection interval (the interval a) to the first-stage interval $b_1$ in the non-projection interval (the interval b), the switching from the pulse pattern for adjusting the swing amount (Refer to FIG. 4C.) to the pulse pattern for keeping the swing amount (Refer to FIG. 4B.) at the timing when the interval is switched from the first-stage interval $b_1$ to the second-stage interval $b_2$, and the switching from the pulse pattern for keeping the swing amount (Refer to FIG. 4B.) to the pulse pattern for projection (Refer to FIG. 4A.) at the timing when the interval is switched from the second-stage interval $b_2$ to the projection interval (the interval a). In this way, the pulse pattern is set to the pulse pattern of the pulse signal generated by the drive signal generation unit 6 corresponding to each interval. That makes it possible to make the swing amount of the electromagnetic driven scan mirror 4 smaller as the angle at which the laser beam is projected on the screen S becomes shallower, and to correct the trapezoidal distortion so that the image projected on the screen S becomes a rectangle.

Particularly, in the second-stage interval $b_2$ in the non-projection interval (the interval b), as the swing amount of the electromagnetic driven scan mirror 4 is kept at the first swing amount corresponding to the starting position in the projection interval (the interval a) until the scan position returns to the starting position of the next projection interval (the interval a), it is possible to move on to the scan in the next projection interval (the interval a) smoothly.

Thus, by making the swing amount of the electromagnetic driven scan mirror 4 smaller as the angle at which the laser beam is projected on the screen S becomes shallower according to the angle of the electromagnetic driven scan mirror 4 in the vertical direction, the image projected on the screen S is corrected to become a rectangle.

In addition, when the swing amount of the electromagnetic driven scan mirror 4 in the vertical direction is adjusted so that the spaces between the trajectories of the laser beam scanned by the electromagnetic driven scan mirror 4 in the horizontal direction are equal, a rectangular image whose aspect ratio is kept at a desired aspect ratio can be projected on the screen S.

As described above, according to the laser projector 100 in the present invention, the image projected on the screen S can be corrected to become a rectangle by making the swing amount of the electromagnetic driven scan mirror 4 smaller as the angle at which the laser beam is projected on the screen S becomes shallower according to the angle α (one of the elevation angle and the depression angle) at which the laser projector 100 (the case 100*a*) is set to the projection screen S.

Particularly, in the laser projector 100, when the interval is switched to the projection interval (the interval a) where an image is formed on the screen S, the swing amount of the electromagnetic driven scan mirror 4 has been kept at the first swing amount, i.e., the swing amount at the starting position in the projection interval (the interval a) since the second-stage interval $b_2$ in the non-projection interval (the interval b) before the switching to the projection interval (the interval a). Accordingly, when the interval is switched to the projection interval (the interval a), it is possible to perform the scan at the first swing amount immediately and to project the corrected image easily with the swing amount of the electromagnetic driven scan mirror 4 adjusted from the first swing amount to the second swing amount. Therefore, the projected image can be corrected more assuredly.

Additionally, in the embodiment described above, the pulse pattern for projection in the projection interval (the interval a) is described as the pulse pattern shown in FIG. 4A, the pulse pattern for adjusting the swing amount in the first-stage interval $b_1$ in the non-projection interval (the interval b) is described as the pulse pattern shown in FIG. 4C, and the pulse pattern for keeping the swing amount in second-stage interval $b_2$ in the non-projection interval (the interval b) is described as the pulse pattern shown in FIG. 4B as examples. However, the present invention is not limited to these examples. For example, pulse pattern for projection in the projection interval (the interval a) may be described as the pulse patterns shown in FIG. 5B or FIG. 6B, the pulse pattern for adjusting the swing amount in the first-stage interval $b_1$ in the non-projection interval (the interval b) may be described as the pulse patterns shown in FIG. 5C or FIG. 6C, and the pulse pattern for keeping the swing amount in second-stage interval $b_2$ in the non-projection interval (the interval b) may be described as the pulse patterns shown in FIG. 5A or FIG. 6A. Furthermore, the pulse pattern for projection in the projection interval (the interval a) may be described as the pulse pattern shown in FIG. 7B, the pulse pattern for adjusting the swing amount in the first-stage interval $b_1$ in the non-projection interval (the interval b) may be described as the pulse pattern shown in FIG. 7C, and the pulse pattern for keeping the swing amount in second-stage interval $b_2$ in the non-projection interval (the interval b) may be described as the pulse pattern shown in FIG. 7A.

Alternatively, the swing amount of each interval may be adjusted with another pulse pattern by combining some of increase or decrease of the pulse number, increase or decrease of the pulse width, and increase or decrease of the pulse vibration amplitude, for example.

Furthermore, the drive signal generation unit 6 may generate the pulse signal according to the angle α (one of the elevation angle and the depression angle) of the laser projector 100 (the case 100*a*) detected by the obliquity angle sensor 5, or the drive signal generation unit 6 may generate the pulse signal according to the angle α (one of the elevation angle and the depression angle) of the laser projector 100 (the case 100*a*) inputted by a manual operation of the operation unit 1.

Further, it should be understood that the concrete detailed structures etc. other than the above can be changed as appropriate.

According to a first aspect of the preferred embodiments of the present invention, there is provided a laser projector 100, including, laser light sources 2 to project a laser beam, an electromagnetic driven scan mirror 4 to scan the laser beam in a horizontal direction and a vertical direction to form an image on a screen S with a trajectory of the laser beam scanned in the horizontal direction being lined up in the vertical direction, a drive signal generation unit 6 to generate a drive signal causing the electromagnetic driven scan mirror 4 to scan the laser beam in the horizontal direction, a mirror drive unit 7 to drive the electromagnetic driven scan mirror 4 back and forth so that the laser beam is scanned in the horizontal direction in response to the drive signal and a CPU 101 to adjust a pulse pattern of the drive signal in order to change a swing amount of the electromagnetic driven scan mirror 4 to scan the laser beam in the horizontal direction, wherein the CPU 101 adjusts the pulse pattern to a first pulse pattern for projection for adjusting the swing amount from a first swing amount to a second swing amount in a projection interval (an interval a) where a scan position in the vertical direction is shifted from a starting position to an ending position with the electromagnetic driven scan mirror 4 scanning the laser beam in the horizontal direction to form the image on the screen S, adjusts the pulse pattern to a second pulse pattern for adjusting the swing amount from the second swing amount back to the first swing amount in a first-stage interval (a swing amount adjustment interval) $b_1$ in a non-projection interval b where the scan position in the vertical direction is shifted from the ending position back to the starting position, and adjusts the pulse pattern to a third pulse pattern for keeping the swing amount at the first swing amount in a second-stage interval (a swing amount keeping interval) $b_2$ in the non-projection interval b until the scan position returns to the starting position in the projection interval.

Preferably, the CPU 101 adjusts the second pulse pattern so that the length of the first-stage interval (a swing amount adjustment interval) $b_1$ in a non-projection interval b is shortened.

Preferably, the CPU 101 adjusts the swing amount of the electromagnetic driven scan mirror 4 by increasing or decreasing the number of the drive signal.

Preferably, the CPU 101 adjusts the swing amount of the electromagnetic driven scan mirror 4 by increasing or decreasing the width of the drive signal.

Preferably, the CPU 101 increases or decreases the width of the drive signal with the center of the drive signal fixed.

Preferably, the CPU 101 adjusts the swing amount of the electromagnetic driven scan mirror 4 by increasing or decreasing the vibration amplitude of the drive signal.

Preferably, the laser projector 100 further includes an obliquity angle sensor 5 to detect one of an elevation angle and a depression angle at which the laser projector 100 is set to the screen S, wherein the CPU 101 performs control so as to adjust the pulse pattern of the drive signal according to the angle detected by the obliquity angle sensor 5, and so as to make the swing amount of the electromagnetic driven scan mirror 4 smaller as the angle at which the laser beam is projected on the screen S becomes shallower.

According to a second aspect of the preferred embodiments of the present invention, there is provided a laser projector 100, including, laser light sources 2 to project a laser beam, an electromagnetic driven scan mirror 4 to scan the laser beam in a horizontal direction and a vertical direction to form an image on a screen S with a trajectory of the laser beam scanned in the horizontal direction being lined up in the vertical direction, a drive signal generation unit 6 to generate a drive signal causing the electromagnetic driven scan mirror 4 to scan the laser beam in the horizontal direction, a mirror drive unit 7 to drive the electromagnetic driven scan mirror 4 back and forth so that the laser beam is scanned in the horizontal direction in response to the drive signal, an obliquity angle sensor 5 to detect one of an elevation angle and a depression angle at which the laser projector is set to the screen S and a CPU 101 to adjust a pulse pattern of the drive signal in order to change a swing amount of the electromagnetic driven scan mirror 4 to scan the laser beam in the horizontal direction according to the angle detected by the obliquity angle sensor 5, wherein the CPU 101 adjusts the swing amount of the electromagnetic driven scan mirror 4 by performing control to adjust the pulse pattern of the drive signal according to the angle detected by the obliquity angle sensor 5 by, at least one of, increasing or decreasing the number of the drive signal, increasing or decreasing the width of the drive signal and increasing or decreasing the vibration amplitude of the drive signal, so that the CPU 101 adjusts the pulse pattern to a first pulse pattern for projection for adjusting the swing amount from a first swing amount to a second swing amount in a projection interval (an interval a) where a scan position in the vertical direction is shifted from a starting position to an ending position with the electromagnetic driven scan mirror 4 scanning the laser beam in the horizontal direction to form the image on the screen S, adjusts the pulse pattern to a second pulse pattern for adjusting the swing amount from the second swing amount back to the first swing amount in a first-stage interval (a swing amount adjustment interval) $b_1$ in a non-projection interval b where the scan position in the vertical direction is shifted from the ending position back to the starting position, and adjusts the pulse pattern to a third pulse pattern for keeping the swing amount at the first swing amount in a second-stage interval (a swing amount keeping interval) $b_2$ in the non-projection interval b until the scan position returns to the starting position in the projection interval, and the CPU 101 makes the swing amount of the electromagnetic driven scan mirror 4 smaller as the angle at which the laser beam is projected on the screen S becomes shallower.

According to the present invention, as the laser projector can adjust the pulse pattern of the pulse signal so as to make the swing amount of the scan unit to scan the laser beam in the horizontal direction smaller as the angle at which the laser beam is projected on the projection surface becomes shallower, it is possible to correct a projected image formed on the projection surface so that the image becomes a rectangle.

Particularly, the laser projector is configured so that the pulse pattern adjustment unit adjusts the pulse pattern to a first pulse pattern for projection for adjusting the swing amount from a first swing amount to a second swing amount in a projection interval where a scan position in the vertical direction is shifted from a starting position to an ending position with the scan unit scanning the laser beam in the horizontal direction to form the image on the projection surface. Moreover, the laser projector is configured so that the pulse pattern adjustment unit adjusts the pulse pattern to a second pulse pattern for adjusting the swing amount from the second swing amount back to the first swing amount in a first-stage interval (for example, a swing amount adjustment interval) in a non-projection interval where the scan position in the vertical direction is shifted from the ending position back to the starting position. Furthermore, the laser projector is configured so that the pulse pattern adjustment unit adjusts the pulse pattern to a third pulse pattern for keeping the swing amount at the first swing amount in a second-stage interval (for example, a swing amount keeping interval) in the non-projection interval until the scan position returns to the starting position in the projection interval.

That is to say, in the second-stage interval in the non-projection interval just before the projection interval where the image is formed on the projection surface starts, the swing amount of the scan unit is kept at the first swing amount corresponding to the starting position in the projection interval. Accordingly, when the interval is switched from the second-stage interval in the non-projection interval to the projection interval, the scan at the first swing amount can be performed immediately. Therefore, it is possible to adjust the swing amount of the scan unit from the first swing amount to the second swing amount and to project the corrected image easily. Consequently, the projected image can be corrected more assuredly.

The entire disclosure of Japanese Patent Application No. 2009-110250 filed on Apr. 30, 2009 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A laser projector, comprising:
   a laser light source to project a laser beam;
   a scan unit to scan the laser beam in a horizontal direction and a vertical direction to form an image on a projection surface with a trajectory of the laser beam scanned in the horizontal direction being lined up in the vertical direction;
   a scan signal generation unit to generate a pulse signal causing the scan unit to scan the laser beam in the horizontal direction;
   a drive unit to drive the scan unit back and forth so that the laser beam is scanned in the horizontal direction in response to the pulse signal; and
   a pulse pattern adjustment unit to adjust a pulse pattern of the pulse signal in order to change a swing amount of the scan unit to scan the laser beam in the horizontal direction; wherein
   the pulse pattern adjustment unit adjusts the pulse pattern to a first pulse pattern for projection for adjusting the swing amount from a first swing amount to a second swing amount in a projection interval where a scan position in the vertical direction is shifted from a starting position to an ending position with the scan unit scanning the laser beam in the horizontal direction to form the image on the projection surface, adjusts the pulse pattern to a second pulse pattern for adjusting the swing amount from the second swing amount back to the first swing amount in a first-stage interval in a non-projection interval where the scan position in the vertical direction is shifted from the ending position back to the starting position, and adjusts the pulse pattern to a third pulse pattern for keeping the swing amount at the first swing amount in a second-stage interval in the non-projection interval until the scan position returns to the starting position in the projection interval.

2. The laser projector according to claim 1, wherein the pulse pattern adjustment unit adjusts the second pulse pattern so that the length of the first-stage interval in the non-projection interval is shortened.

3. The laser projector according to claim 1, wherein the pulse pattern adjustment unit adjusts the swing amount of the scan unit by increasing or decreasing the number of the pulse signal.

4. The laser projector according to claim 1, wherein the pulse pattern adjustment unit adjusts the swing amount of the scan unit by increasing or decreasing the width of the pulse signal.

5. The laser projector according to claim 4, wherein the pulse pattern adjustment unit increases or decreases the width of the pulse signal with the pulse center fixed.

6. The laser projector according to claim 1, wherein the pulse pattern adjustment unit adjusts the swing amount of the scan unit by increasing or decreasing the vibration amplitude of the pulse signal.

7. The laser projector according to claim 1, further comprising an angle detection unit to detect one of an elevation angle and a depression angle at which the laser projector is set to the projection surface, wherein the pulse pattern adjustment unit performs control so as to adjust the pulse pattern of the pulse signal according to the angle detected by the angle detection unit, and so as to make the swing amount of the scan unit smaller as the angle at which the laser beam is projected on the projection surface becomes shallower.

8. A laser projector, comprising:
   a laser light source to project a laser beam;
   a scan unit to scan the laser beam in a horizontal direction and a vertical direction to form an image on a projection surface with a trajectory of the laser beam scanned in the horizontal direction being lined up in the vertical direction;
   a scan signal generation unit to generate a pulse signal causing the scan unit to scan the laser beam in the horizontal direction;
   a drive unit to drive the scan unit back and forth so that the laser beam is scanned in the horizontal direction in response to the pulse signal;
   an angle detection unit to detect one of an elevation angle and a depression angle at which the laser projector is set to the projection surface, and
   a pulse pattern adjustment unit to adjust a pulse pattern of the pulse signal in order to change a swing amount of the scan unit to scan the laser beam in the horizontal direction according to the angle detected by the angle detection unit; wherein
   the pulse pattern adjustment unit adjusts the swing amount of the scan unit by performing control to adjust the pulse pattern of the pulse signal according to the angle detected by the angle detection unit by, at least one of, increasing or decreasing the number of the pulse signal, increasing or decreasing the width of the pulse signal and increasing or decreasing the vibration amplitude of the pulse signal, so that
   the pulse pattern adjustment unit adjusts the pulse pattern to a first pulse pattern for projection for adjusting the swing amount from a first swing amount to a second swing amount in a projection interval where a scan position in the vertical direction is shifted from a starting position to an ending position with the scan unit scanning the laser beam in the horizontal direction to form the image on the projection surface, adjusts the pulse pattern to a second pulse pattern for adjusting the swing amount from the second swing amount back to the first swing amount in a first-stage interval in a non-projection interval where the scan position in the vertical direction is shifted from the ending position back to the starting position, and adjusts the pulse pattern to a third pulse pattern for keeping the swing amount at the first swing amount in a second-stage interval in the non-projection interval until the scan position returns to the starting position in the projection interval, and
   the pulse pattern adjustment unit makes the swing amount of the scan unit smaller as the angle at which the laser beam is projected on the projection surface becomes shallower.

* * * * *